United States Patent [19]

Arakawa et al.

[11] Patent Number: 5,796,610
[45] Date of Patent: Aug. 18, 1998

[54] METHOD OF DETECTING SEAM CHARACTERISTIC POINTS

[75] Inventors: Kenichi Arakawa, Tokorozawa; Takao Kakizaki, Kodaira; Shinji Omyo, Sayama, all of Japan

[73] Assignees: Nippon Telegraph and Telephone Corporation; Honda Giken Kogyo Kabushiki Kaisha, both of Tokyo, Japan

[21] Appl. No.: 736,540

[22] Filed: Oct. 24, 1996

[30] Foreign Application Priority Data

Oct. 30, 1995 [JP] Japan ................. 7-281629

[51] Int. Cl.$^6$ .................................... G06F 19/00
[52] U.S. Cl. ................. 364/167.01; 219/124.34; 318/577; 395/94; 901/42; 901/47
[58] Field of Search .............. 364/167.01, 474.03, 364/477.06, 474.37; 318/576, 577; 219/124.34; 901/42, 47; 395/88, 94

[56] References Cited

U.S. PATENT DOCUMENTS

| | | | |
|---|---|---|---|
| 4,413,910 | 11/1983 | Cornu et al. | 219/124.34 |
| 4,501,950 | 2/1985 | Richardson | 219/124.34 |
| 4,672,190 | 6/1987 | Rostkowski et al. | 364/474.03 X |
| 4,815,006 | 3/1989 | Anderson et al. | 395/94 X |
| 4,831,232 | 5/1989 | Andersson et al. | 219/124.34 |
| 5,570,458 | 10/1996 | Umeno et al. | 395/88 |

FOREIGN PATENT DOCUMENTS 5-312509  11/1993  Japan.

*Primary Examiner*—Joseph Ruggiero
*Attorney, Agent, or Firm*—Jordan and Hamburg

[57] ABSTRACT

In order to provide a method of detecting seam characteristic points which makes it possible to accurately and quickly detect seam characteristic points, which are used as work target positions, by using coordinate data of a series of distance points detected by a sensor, when sealing is performed by a robot (1) equipped with a sensor (2), seam characteristic points P of an object are detected, a distance to an arbitrary cross section of an object is detected by the sensor (2), the data obtained through the measurement are converted into coordinate data of a series of distance points arranged in a predetermined order, a statistic value regarding the distance between paired adjacent distance points among the series of distant points is calculated so as to obtain a threshold level for judging discontinuity, based on the statistic value, the distance between paired adjacent distance points is compared with the discontinuity threshold level so as to detect a pair of adjacent distance points which are separated from each other by a distance equal to or greater than the threshold level, the center point between the detected pair of adjacent distance points which are separated from each other by a distance equal to or greater than the threshold level is obtained as a seam characteristic point.

16 Claims, 12 Drawing Sheets

METHOD OF DETECTING SEAM CHARACTERISTIC POINTS

BACKGROUND OF THE INVENTION

The present invention relates to a method of detecting seam characteristic points while sealing is performed by a robot equipped with a sensor, which method can quickly, automatically, and accurately detect seam characteristic points at which work is to be performed (more precisely, work target positions in the vicinity of a seam portion).

When a step of manufacturing an industrial product is automated through use of a robot, there has generally been employed a teaching-playback method, in which a motion is taught to the robot and the robot is then operated to repeat the taught motion.

In such a teaching-playback method, differences between objects to be worked cause variations in their three-dimensional shapes, and the degree of consistency between an actual position and a commanded position (i.e., positioning accuracy) is low. Therefore, a difficulty arises in automating the robot-assisted work for some kinds of work, such as welding, in which end points of each object to be worked are to be followed.

In order to eliminate the above-described difficulty, there has been used a method in which a sensor is attached to a robot, and the status of an object is measured immediately before the robot performs work so as to determine the actual work action of the robot.

Such a method; i.e., a shape processing method in which the state of an object to be worked is measured so as to determine work target positions and the like, is disclosed, for example, in "Three-dimensional Position Correction System Utilizing Image Processing Apparatus", Watanabe and Arimatsu, Robot No. 95, pp. 62–71, and "Sealing Robot System with an Apparatus for Detecting a Positional Shift of a Vehicle Body", Kunikiyo, Aizawa, and Sugano, Robot No. 77, pp. 86–95.

In the methods disclosed in these papers, an entire object is regarded as one rigid body, and a positional shift at a part of the object is detected so as to correct movement of a robot. Accordingly, these methods cannot be directly applied to objects, such as vehicle bodies, which partially deform in various ways.

In order to solve the above-described problem, there have been proposed shape processing methods in which a cross-sectional shape in the vicinity of a portion to be worked is measured directly, as disclosed, for example, in "Shape Processing Method", Kaneko, Japanese Patent Application No. Hei 4-114428 (Japanese Patent Laid-open No. Hei 5-312509). Among such methods, there is a method in which models are previously prepared each of which represents a cross-sectional shape in the vicinity of an end portion of a metallic plate-like object. In this method, coordinate data of a series of distance points representing a cross-sectional shape of a line-shaped welding portion that a robot is required to follow are obtained by a sensor, and a pattern matching operation utilizing a least square method is applied to the data so as to find a model that matches the data.

In the above-described shape processing method in which the cross-sectional shape in the vicinity of a portion to be worked is measured directly, when sealing is performed, pattern matching must be performed between the coordinate data of a series of distance points and each model that represents the cross-sectional shape of a seam portion to be worked. Accordingly, in order to cope with a variety of shapes of the seam portion, a corresponding process is required for each set of plural models, resulting in extremely complex processing. Moreover, since the shape processing method of this kind requires a prolonged period of time to detect each seam characteristic point, working time cannot be shortened.

Moreover, since noise due to sensing is superposed on distance data, the distance data do not have spatially uniform distribution. Accordingly, pattern matching based on, for example, a least square method becomes less reliable, so that seam characteristic points become difficult to detect stably.

SUMMARY OF THE INVENTION

Major objects to be achieved by the present invention are as follows.

A first object of the present invention is to provide a method of detecting seam characteristic positions, which method makes it possible to accurately, stably, and reliably detect seam characteristic points of a seam having a variety of cross-sectional shapes.

A second object of the present invention is to provide a method of detecting seam characteristic positions, which method makes it possible to stably and reliably detect seam characteristic points from coordinate data of a series of distance points on which noise is superposed, or from measured distance data which do not have spatially uniform distribution, regardless of the direction of measurement by a sensor.

A third object of the present invention is to provide a method of detecting seam characteristic positions which makes it possible to detect seam characteristic points of an object at high speed, thereby shortening the working time.

A fourth object of the present invention is to provide a method of detecting seam characteristic positions which can determine a clearance value of a seam portion, which is useful for work, in accordance with the state of an object to be worked.

Other objects of the present invention will become apparent from the specification and drawings, especially from the description of claims.

The above-described problems are solved by employing the following novel and characteristic methods of the present invention, and the objects of the present invention are achieved thereby.

That is, a first feature of the method of the present invention resides in a method of detecting seam characteristic points of an object while sealing is performed by a robot equipped with a sensor. The method comprises the steps of measuring a distance to an arbitrary cross section of an object with the sensor, converting data obtained through the measurement into coordinate data of a series of distance points arranged in a predetermined order, calculating a statistic value regarding the distance between paired adjacent distance points among the series of distant points, obtaining a threshold level for judging discontinuity, based on the statistic value, comparing the distance between paired adjacent distance points with the discontinuity threshold level so as to detect a pair of adjacent distance points which are separated from each other by a distance equal to or greater than the threshold level, and performing calculation processing corresponding to the number of detected pairs, each pair including two adjacent distance points which are separated from each other by a distance equal to or greater than the threshold level, so as to obtain a seam characteristic point.

A second feature of the method of the present invention resides in a method of detecting seam characteristic points of an object while sealing is performed by a robot equipped with a sensor. The method comprises the steps of measuring a distance to an arbitrary cross section of an object with the sensor, converting data obtained through the measurement into coordinate data of a series of distance points arranged in a predetermined order, calculating a statistic value regarding the distance between paired adjacent distance points among the series of distant points, obtaining a threshold level for judging discontinuity, based on the statistic value, comparing the distance between paired adjacent distance points with the discontinuity threshold level so as to detect a pair of adjacent distance points which are separated from each other by a distance equal to or greater than the threshold level, and counting the number of detected pairs, each pair including two adjacent distance points which are separated from each other by a distance equal to or greater than the threshold level. When the total number of the counted pairs is one, a step is performed in which the center point between the detected pair of distance points separated from each other by a distance equal to or greater than the threshold level is obtained as a seam characteristic point. When the total number of the counted pairs is equal to or greater than two, a step is performed in which the center point between each detected pair of distance points is obtained as a seam characteristic candidate point, and the center of gravity of the seam characteristic candidate points is obtained as a seam characteristic point.

A third feature of the method of the present invention resides in a method of detecting seam characteristic points which has a step in which the size of the discontinuity between the pair of distance points separated from each other by a distance equal to or greater than the threshold level in the first or second feature of the method of the present invention is obtained as a clearance value.

A fourth feature of the method of the present invention resides in a method of detecting seam characteristic points which has a step in which the largest one of the distances between the seam characteristic candidate points in the second feature of the method of the present invention is obtained as a clearance value.

A fifth feature of the method of the present invention resides in a method of detecting seam characteristic points which has the first or second feature of the method of the present invention and which further comprises a step in which when a pair of distance points separated from each other by a distance equal to or greater than the threshold level is not detected, a preset model representing a curved shape is compared with the coordinate data of a series of distance points so as to determine a bend point and the coordinates of the bend point are used as the position of a seam characteristic point.

A sixth feature of the method of the present invention resides in a method of detecting seam characteristic points which has the first or second feature of the method of the present invention and which further comprises a step in which when a pair of distance points separated from each other by a distance equal to or greater than the threshold level is not detected, vectors are created before and after each distance point such that each of the vectors connects a predetermined number of distance points, the inner product of these vectors is calculated, an angle formed by the two vectors is calculated from the inner product, and the coordinates of a distance point whose angle is closest to a predetermined angle is used as the position of a seam characteristic point.

A seventh feature of the method of the present invention resides in a method of detecting seam characteristic points which has the first or second feature of the method of the present invention and which further comprises a step in which when a pair of distance points separated from each other by a distance equal to or greater than the threshold level is not detected, vectors are created before and after each distance point such that each of the vectors connects a predetermined number of distance points, the inner product and outer product of these vectors are calculated, an angle formed by the two vectors is calculated from the inner product, it is judged based on the outer product whether the corner formed by the vectors is concave or convex as viewed from the origin of a sensor coordinate system, and the coordinates of a distance point whose angle is closest to a predetermined angle and whose corner is concave in the direction of observation is used as the position of a seam characteristic point.

An eighth feature of the method of the present invention resides in a method of detecting seam characteristic points which has the first or second feature of the method of the present invention and which further comprises a step in which when a pair of distance points separated from each other by a distance equal to or greater than the threshold level is not detected, vectors are created before and after each distance point such that each of the vectors connects a predetermined number of distance points, the inner product and outer product of the pair of vectors are calculated, and the coordinates of the starting point of the pair of vectors whose outer product is positive and whose inner product has an absolute value closest to zero are used as the position of a seam characteristic point.

A ninth feature of the method of the present invention resides in a method of detecting seam characteristic points which has the first or second feature of the method of the present invention and which further comprises a step in which a range for processing coordinate data of a series of distance points is set such that a seam characteristic point obtained from coordinate data of a series of distance points which was previously measured becomes the center of the range.

A tenth feature of the method of the present invention resides in a method of detecting seam characteristic points which has the first or second feature of the method of the present invention and which further comprises a step in which the width of a range for processing coordinate data of a series of distance points is set based on the number of times of continuous successful detection of seam characteristic points previously obtained.

An eleventh feature of the method of the present invention resides in a method of detecting seam characteristic points which has the first or second feature of the method of the present invention and which further comprises a step in which the sensor is caused to follow an arbitrary cross section in the vicinity of a seam of an object so as to successively obtain seam characteristic points, and when the position of a seam characteristic point is separated from a predicted position of the seem characteristic point which is obtained from the positions of seam characteristic points previously measured by a distance equal to or greater than a preset distance, it is judged that calculation cannot be performed.

A twelfth feature of the method of the present invention resides in a method of detecting seam characteristic points which has the first or second feature of the method of the present invention and which further comprises a step in which when the distance between the seam characteristic candidate points is greater than a preset distance threshold level, it is judged that calculation cannot be performed.

A thirteenth feature of the method of the present invention resides in a method of detecting seam characteristic points which has the first or second feature of the method of the present invention and which further comprises a step in which when noise caused by an isolated point is superposed on coordinate data of a series of distance points obtained through measurement, the noise is removed by filtering using a median filter or the like.

A fourteenth feature of the method of the present invention resides in a method of detecting seam characteristic points of an object. The method comprises the steps of measuring a distance to an arbitrary cross section of an object with a sensor, converting data obtained through the measurement into coordinate data of a series of distance points arranged in a predetermined order, calculating a statistic value regarding the distance between paired adjacent distance points among the series of distant points, obtaining a threshold level for judging discontinuity, based on the statistic value, comparing the distance between paired adjacent distance points with the discontinuity threshold level so as to detect a pair of adjacent distance points which are separated from each other by a distance equal to or greater than the threshold level, and obtaining the coordinates of a seam characteristic point of the object from the detected pair of adjacent distance points which are separated from each other by a distance equal to or greater than the threshold level. When a pair of distance points separated from each other by a distance equal to or greater than the threshold level is not detected, a preset model representing a curved shape is compared with the coordinate data of a series of distance points so as to determine a bend point and the coordinates of the bend point are used as the position of a seam characteristic point.

A fifteenth feature of the method of the present invention resides in a method of detecting seam characteristic points of an object. The method comprises the steps of measuring a distance to an arbitrary cross section of an object with a sensor, converting data obtained through the measurement into coordinate data of a series of distance points arranged in a predetermined order, calculating a statistic value regarding the distance between paired adjacent distance points among the series of distant points, obtaining a threshold level for judging discontinuity, based on the statistic value, comparing the distance between paired adjacent distance points with the discontinuity threshold level so as to detect a pair of adjacent distance points which are separated from each other by a distance equal to or greater than the threshold level, and obtaining the coordinates of a seam characteristic point of the object from the detected pair of adjacent distance points which are separated from each other by a distance equal to or greater than the threshold level. The sensor is caused to follow an arbitrary cross section in the vicinity of a seam characteristic point of an object so as to successively calculate seam characteristic points. When the position of a seam characteristic point is separated from a predicted position of the seem characteristic point which is obtained from the positions of seam characteristic points previously measured by a distance equal to or greater than a preset distance, it is judged that calculation cannot be performed.

A sixteenth feature of the method of the present invention resides in a method of detecting seam characteristic points of an object. The method comprises the steps of measuring a distance to an arbitrary cross section of an object with a sensor, converting data obtained through the measurement into coordinate data of a series of distance points arranged in a predetermined order, calculating a statistic value regarding the distance between paired adjacent distance points among the series of distant points, obtaining a threshold level for judging discontinuity, based on the statistic value, comparing the distance between paired adjacent distance points with the discontinuity threshold level so as to detect a pair of adjacent distance points which are separated from each other by a distance equal to or greater than the threshold level, and obtaining the coordinates of a seam characteristic point of the object from the detected pair of adjacent distance points which are separated from each other by a distance equal to or greater than the threshold level. First and second means are further provided. The first means causes the sensor to follow an arbitrary cross section in the vicinity of a seam characteristic point of the object so as to successively calculate seam characteristic points, and sets a range for processing coordinate data of a series of distance points such that a seam characteristic point obtained from coordinate data of a series of distance points which was measured at a previous time becomes the center of the range. The second means sets the width of the range for processing based on the number of times of continuous successful detection of seam characteristic points previously obtained.

In a method of the present invention, a threshold level, which is used to judge that paired adjacent distance points significantly are separated from each other, is statistically determined from sensing data obtained by a sensor, which measures distance to an arbitrary plane of an object at substantially equal intervals. Through comparison between the threshold level and the distance between the paired adjacent distance points, paired distance points separated from each other by a distance equal to or greater than the threshold level are detected as a discontinuity in the coordinate data of a series of distance points. Based on this discontinuity, a seam characteristic point and a value representing a clearance at the characteristic point are geometrically calculated. Since it is unnecessary to compare the coordinate data with a model of a seam cross sectional shape, it is possible to accurately, stably, and reliably detect a seam characteristic point which is a work point and a clearance value, even when noise is superposed on the sensing data.

In the method of the present invention, a cross-sectional shape in the vicinity of an end point is measured while the cross section is followed, and a seam characteristic point is obtained from the coordinate data of a series of distance points representing the cross-sectional shape. At this time, the correlation between a previously detected characteristic point and a new characteristic point to be detected is predicted. This makes it possible to limit a data range (field of view) while using the previously detected seam characteristic point as the center of the data range as well as to filter candidates of a next seam characteristic point. Accordingly, it becomes possible to detect seam characteristic points with higher reliability as compared with the shape processing method described in the "Prior Art" section.

Moreover, in the method of the present invention, when no discontinued portion exists, a curved portion is used as a substitute. This makes it possible to recover from a failure in detecting discontinuity.

DESCRIPTION OF THE DRAWINGS

While the specification concludes with claims particularly pointing out and distinctly claiming the subject matter of the present invention, it is believed the invention will be better understood from the following description taken in connection with the accompanying drawings in which:

DETAILED DESCRIPTION OF THE EXEMPLARY EMBODIMENT

Next, an embodiment of the present invention will be described in further detail.

Figure 1:
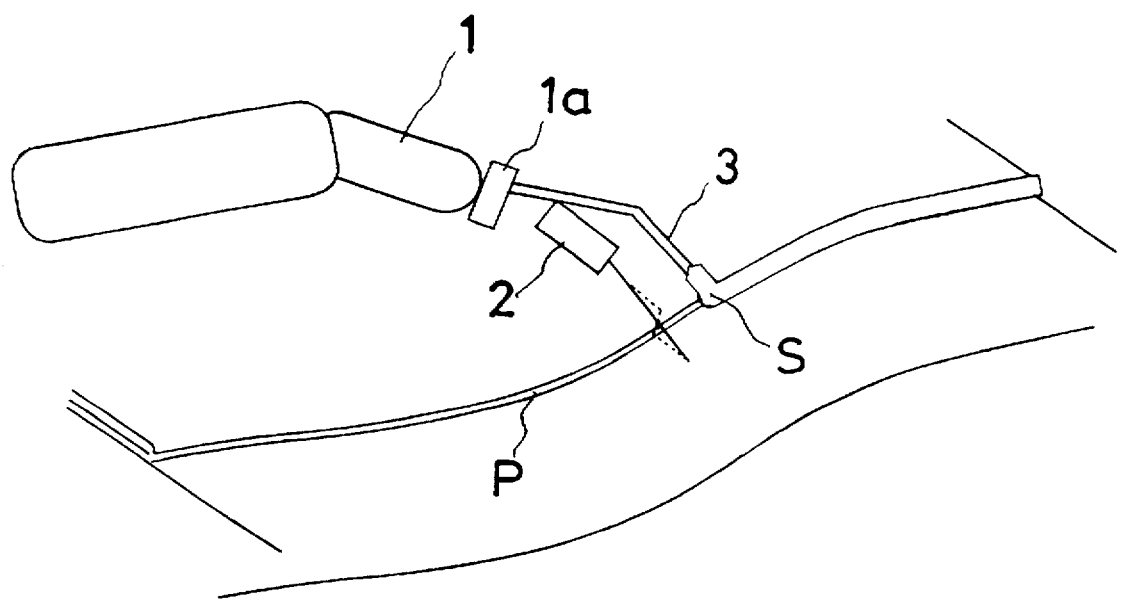
FIG. 1 is an explanatory illustration schematically showing sealing work performed by a robot system for implementing the method of the present invention.
Figure 2A:
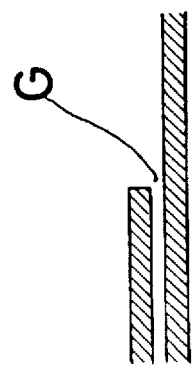
FIG. 2 is an explanatory illustrations showing the kinds of cross-sectional shapes of portions to be subjected to sealing (seam portions), which include (a) two-sheet lap, (b) butting, (c) corner-butting, and (d) three-sheet lap.
Figure 2B:
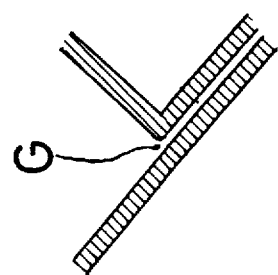
Figure 2C:
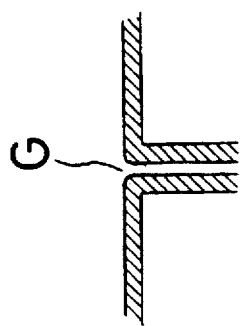
Figure 2D:
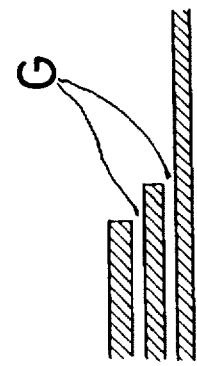

FIG. 1 shows sealing work being performed by a robot equipped with a sensor.

As shown in FIG. 1, the present invention is applied to a robot 1 for sealing work in which a sensor 2 and a nozzle 3 are attached to a hand 1a of the robot 1.

The robot 1, to which the present invention is applied, operates as follows. The robot 1 observes an area in the vicinity of a work target position of an object to be worked (plate-like member) along a direction perpendicular to the surface of the object while following the surface. Data obtained through the measurement are processed by a computer in accordance with a predetermined algorithm so as to automatically detect a seam characteristic point P, which is the work target position. Subsequently, sealing material S is jetted from the nozzle 3 into the clearance at the seam characteristic point P so as to seal the clearance.

A rangefinder, for example, is used as the sensor 2. A laser beam is linearly irradiated through scan operation using a galvano mirror or the like, or is linearly irradiated through use of a cylindrical lens or the like, so that an image is formed on a light receiving element. From the light receiving position on the light receiving element, the distance to each point in a cross section in the vicinity of the seam characteristic point P is measured based on the principle of trigonometrical survey.

FIG. 2 shows an example of the cross-sectional shape of a seam portion of the object (plate-like member) for which sealing is performed by the robot 1.

As shown in FIG. 2, the kinds of cross-sectional shapes of the seam portion include (a) two-sheet lap, (b) butting, (c) corner-butting, (d) three-sheet lap, etc.

Regardless of the shape of the seam portion, sealing is performed so as to provide the airtightness, thereby preventing the introduction of moisture from the outside. Therefore, in many cases, a clearance G exists at the seam portion to be subjected to sealing work.

Figure 3:
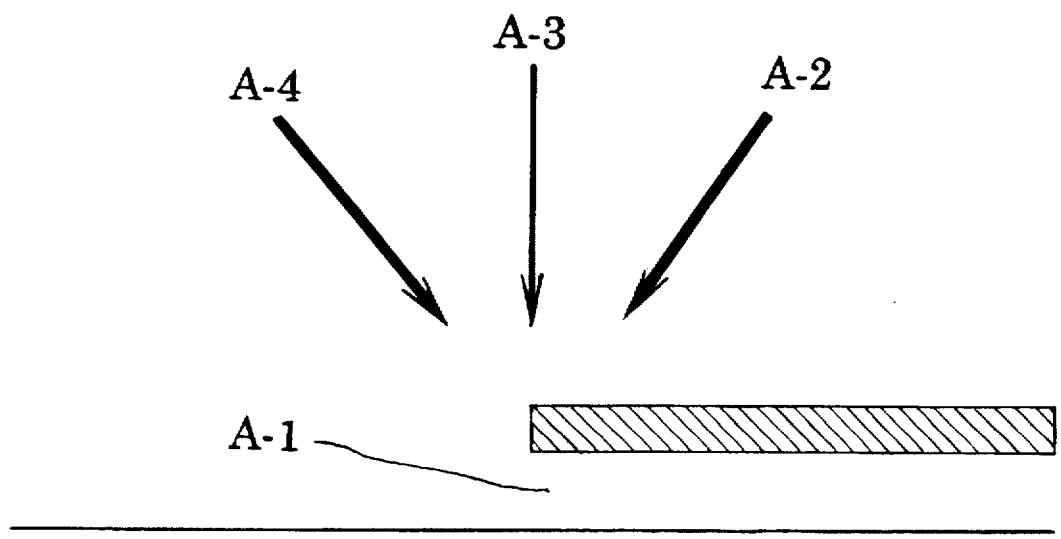
FIG. 3 is a view showing directions along which measurement using a sensor is performed for an area in the vicinity of a seam portion of a so-called two-sheet lap (with a clearance).

When the cross section of the seam portion is measured with the sensor 2, there can be obtained coordinate data of a series of distance points representing a cross-sectional shape which includes a discontinuity. FIG. 3 shows states in which a seam portion between two overlapping members is measured using a sensor 2 from different directions.

Figure 5:
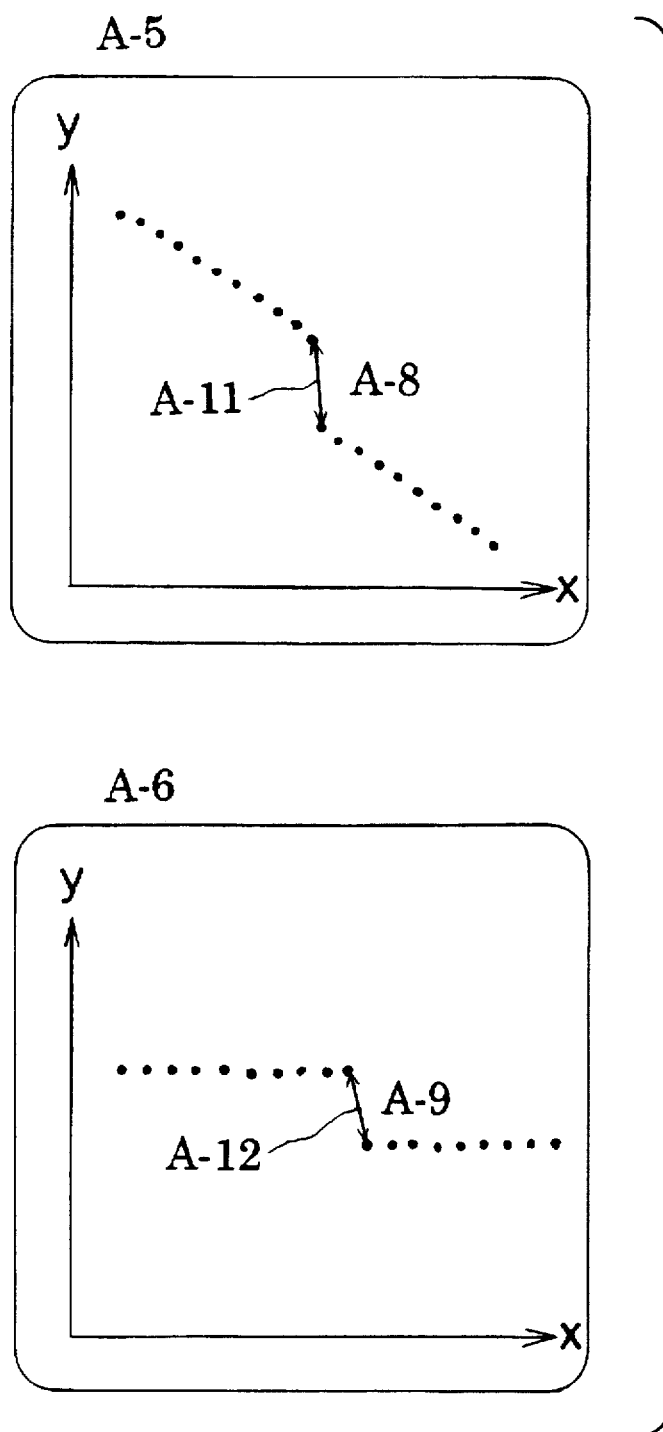
FIG. 5 is A-5 and A-6 being coordinate data of a series of distance points which are respectively obtained by measuring the distance to an area in the vicinity of a seam portion A-1 of FIG. 3 using a sensor along direction A-2 (along which direction the end surface of the upper member cannot be viewed), and along direction A-3 (normal direction).
Figure 6:
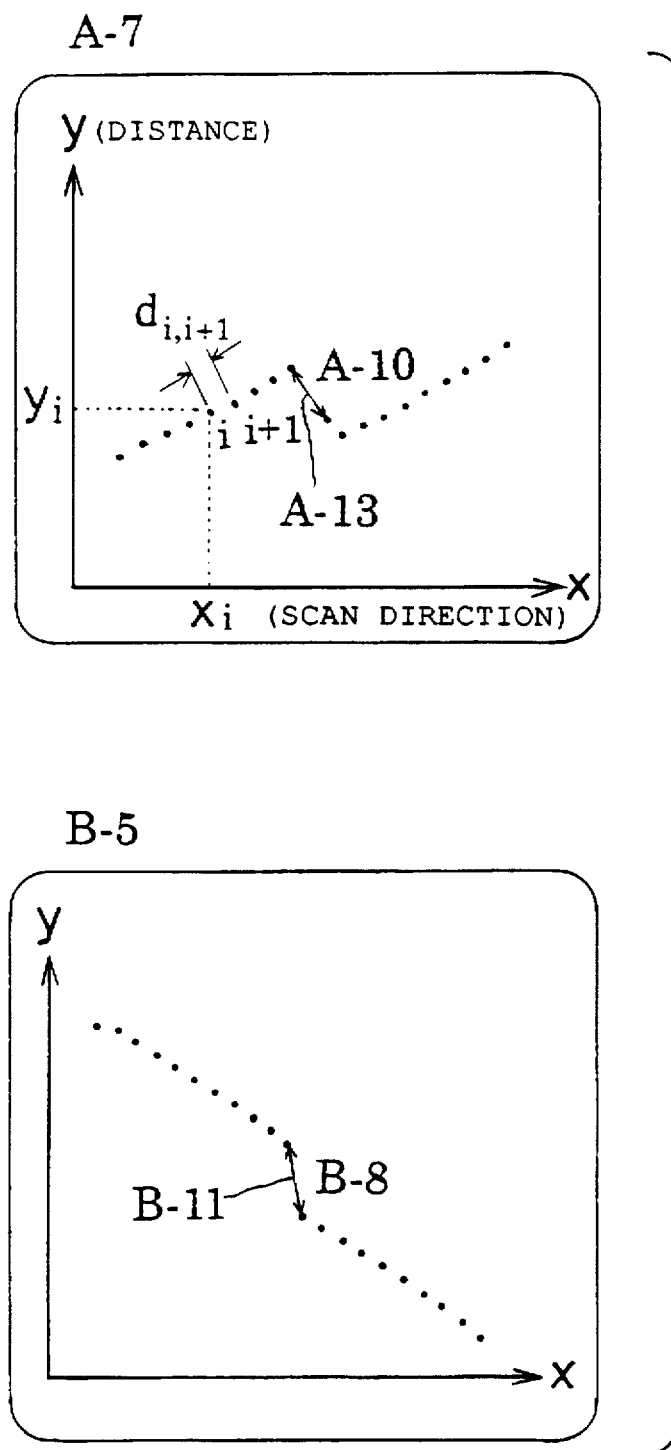
FIG. 6 is A-7 being coordinate data of a series of distance points which are obtained by measuring the distance to the area in the vicinity of the seam portion A-1 of FIG. 3 using the sensor along direction A-4 (along which direction the end surface of the upper member can be viewed), while B-5 being coordinate data of a series of distance points which are obtained by measuring the distance to an area in the vicinity of the seam portion B-1 of FIG. 4 using the sensor along direction B-2 (along which direction the end surface of the upper member cannot be viewed).

The distance to an area in the vicinity of a seam portion A-1 having a clearance (lift) is measured along direction A-2 (along which direction the end surface of the upper member cannot be viewed), along direction A-3 (normal direction), and along direction A-4 (along which direction the end surface of the upper member can be viewed). As shown in FIGS. 5 and 6, coordinate data A-5, A-6, and A-7, each comprised of a series of distance points obtained through the measurement, include discontinuities A-8, A-9, and A-10, respectively.

When the seam portion has a cross sectional shape of a two-sheet lap, each of the center points A-11, A-12, and A-13 of the discontinuities A-8, A-9, and A-10 becomes a seam characteristic point; i.e., a work target position.

When the seam portion has a cross sectional shape of a three-sheet lap, the type of discontinuity that would be detected in the case of a two-sheet lap is detected twice. Therefore, the center of each discontinuity is obtained as a seam characteristic candidate point, and the center of gravity of the seam characteristic candidate points is obtained as a work target position.

Figure 4:
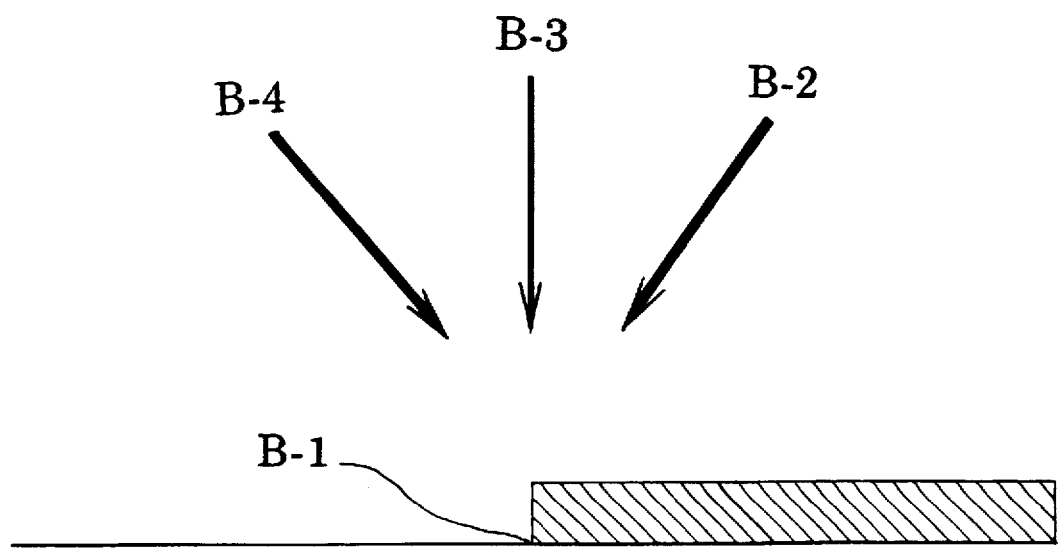
FIG. 4 is a view showing directions along which measurement using a sensor is performed for an area in the vicinity of a seam portion of a so-called two-sheet lap (with no clearance).

A seam portion which does not have clearance is sometimes subjected to sealing work. FIG. 4 shows states in which a seam portion between two overlapped members which has no clearance is measured along different directions using a sensor 2.

The distance to an area in the vicinity of a seam portion B-1 having no clearance is measured along direction B-2

Figure 7:
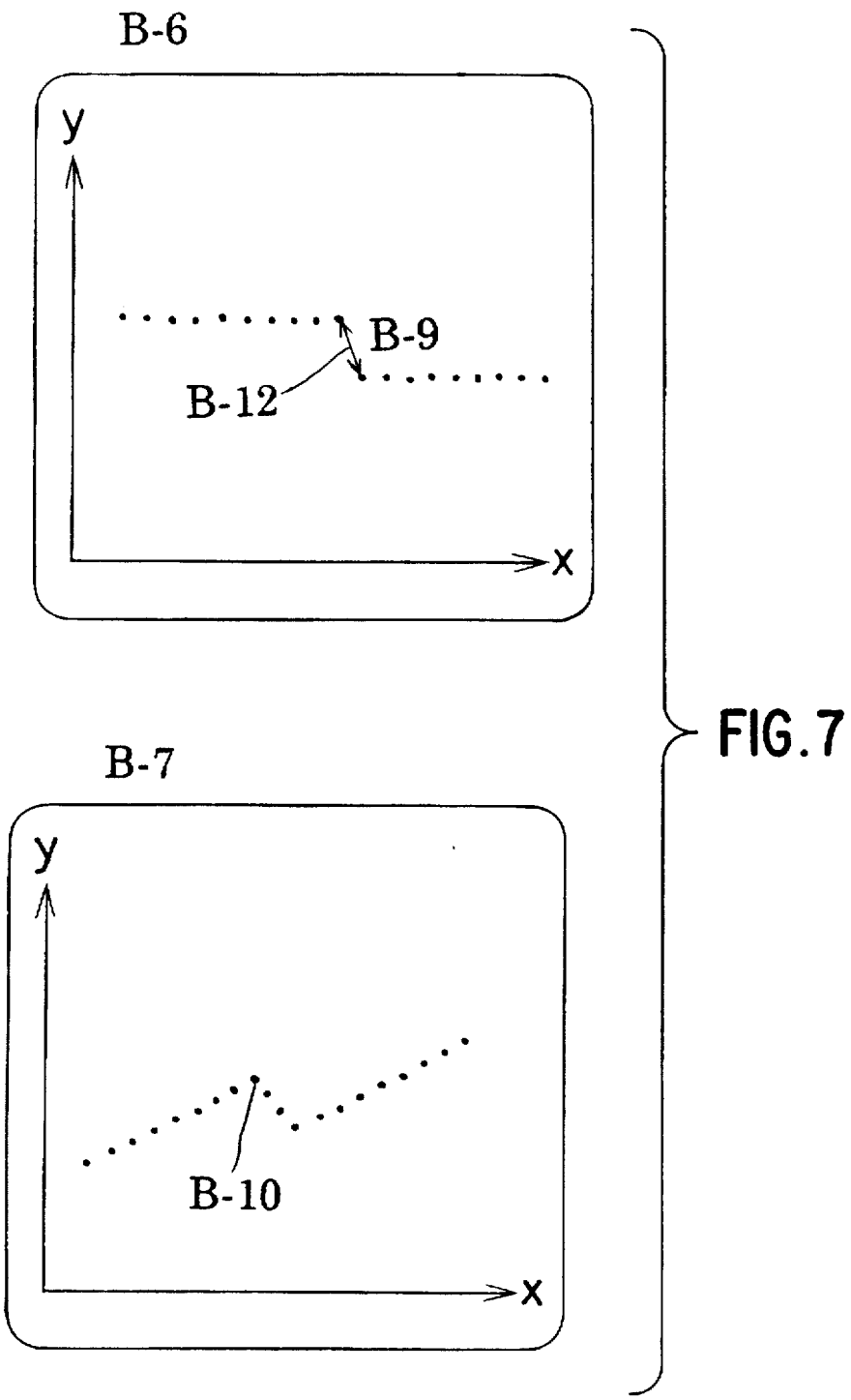
FIG. 7 is B-6 and B-7 being coordinate data of a series of distance points which are respectively obtained by measuring the distance to the area in the vicinity of a seam portion B-1 of FIG. 4 using the sensor along direction B-3 (normal direction) and along direction B-4 (along which direction the end surface of the upper member can be viewed).
Figure 8:
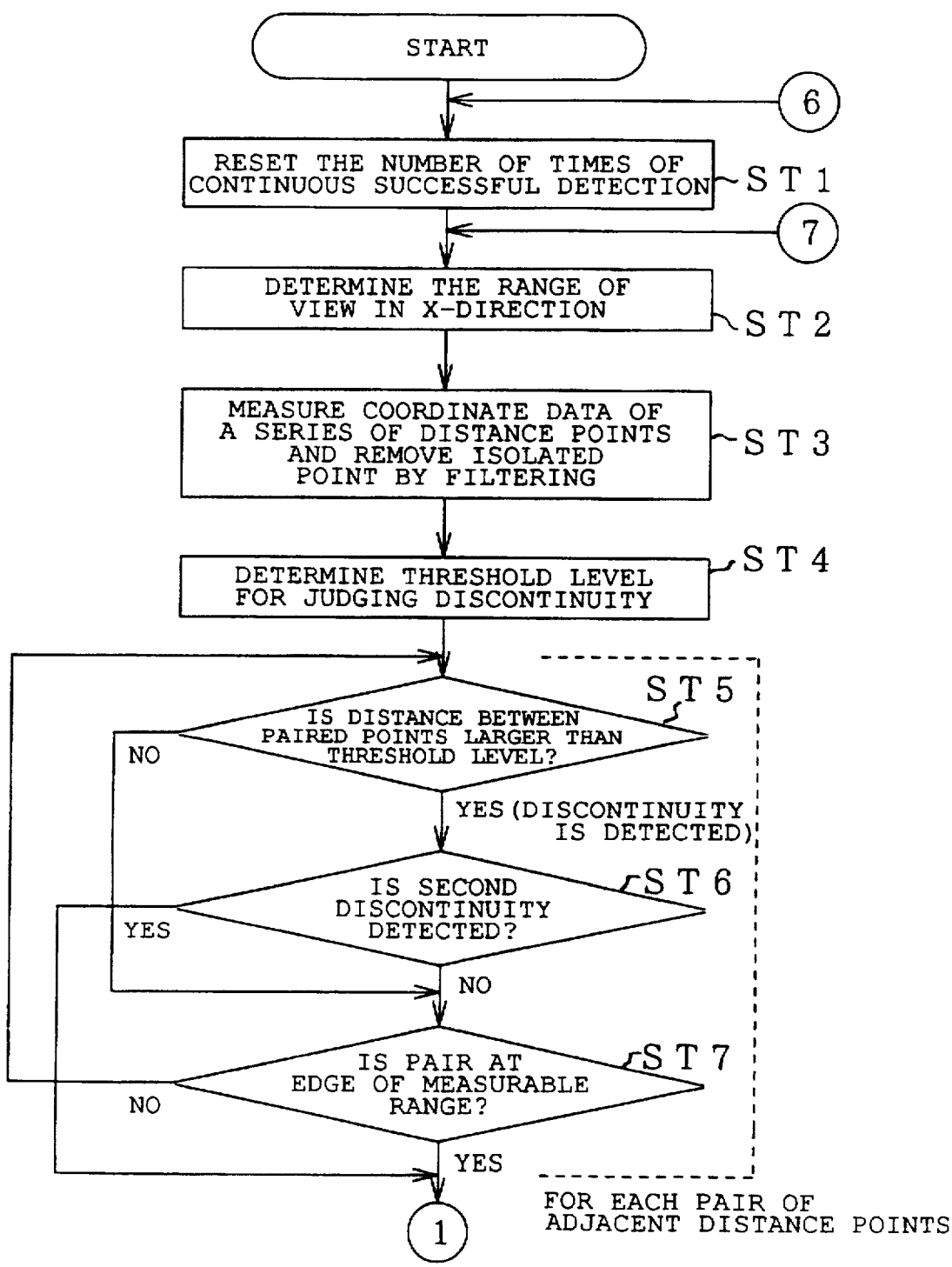
FIG. 8 is a part of a flowchart showing the procedure for detecting seam characteristic points (work target positions) using an example of the method of the present invention.
Figure 9:
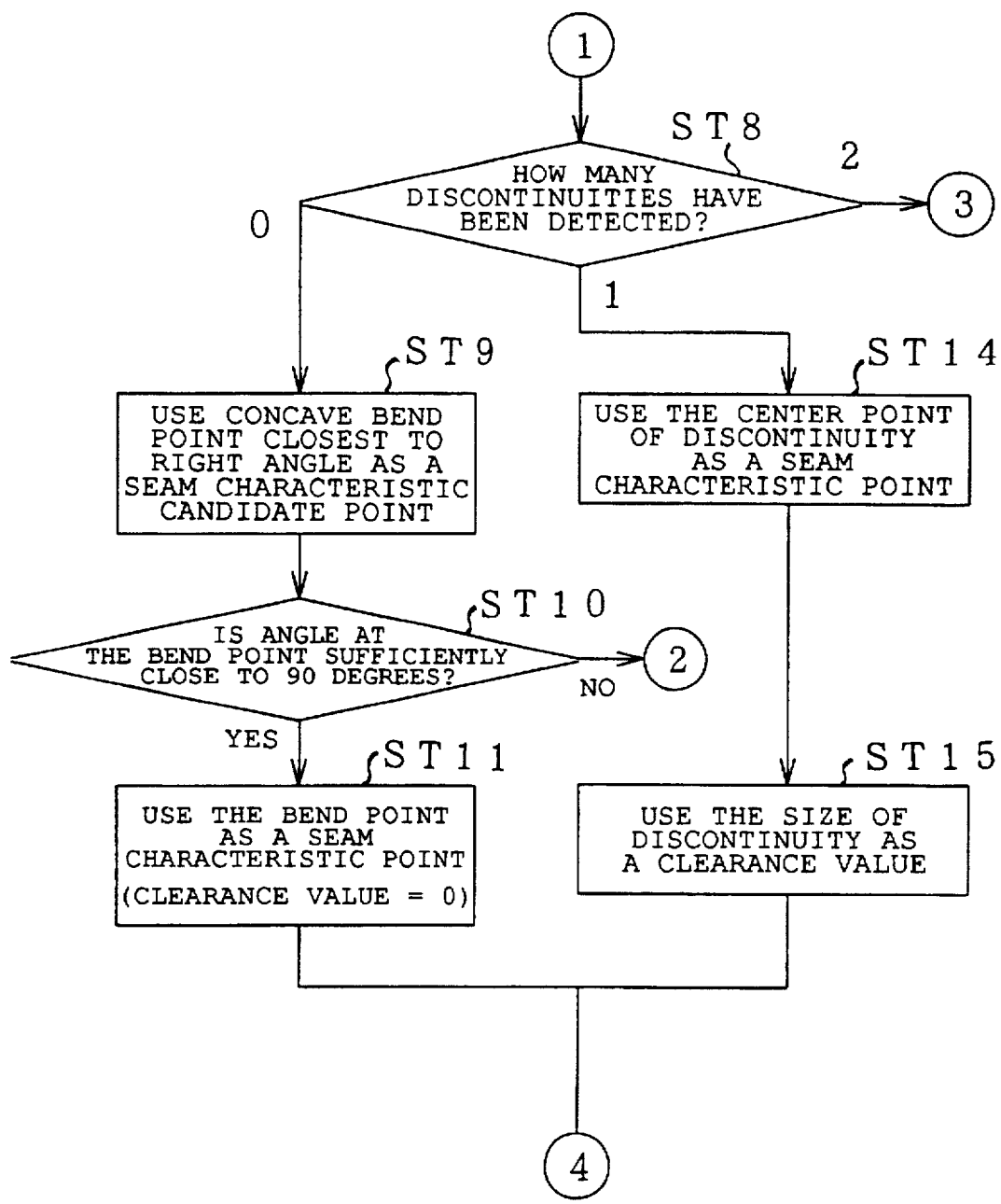
FIG. 9 is a part of the flowchart which shows steps continued from the steps shown in FIG. 8.
Figure 10:
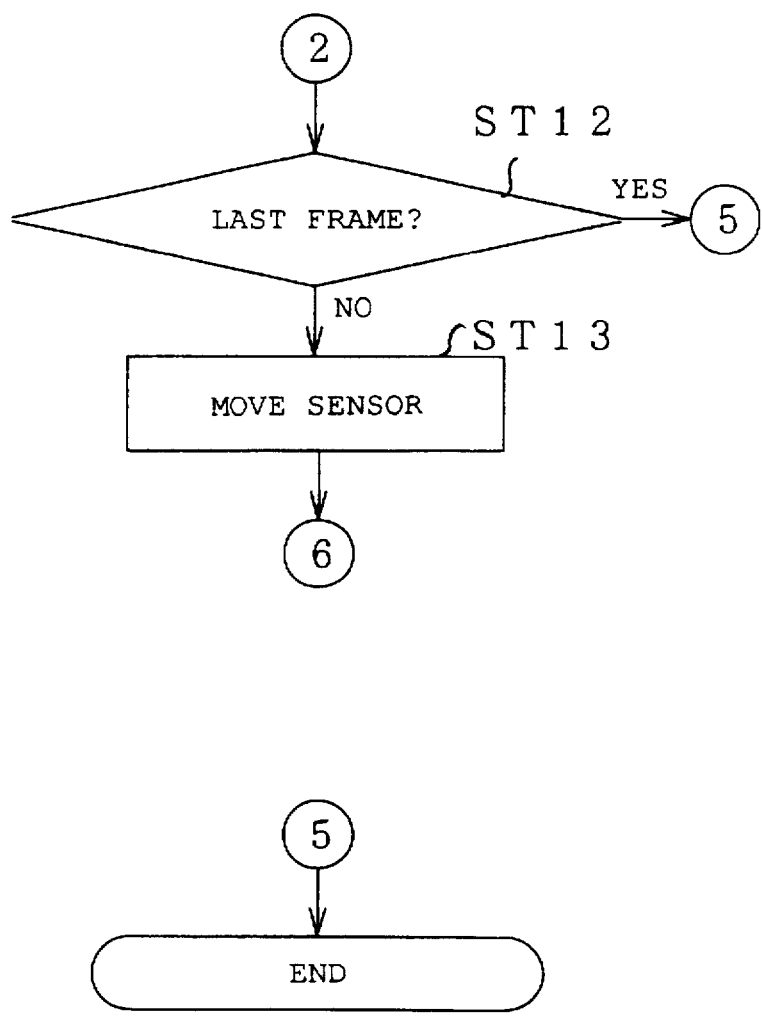
FIG. 10 is a part of the flowchart which shows steps continued from the steps shown in FIG. 8.
Figure 11:
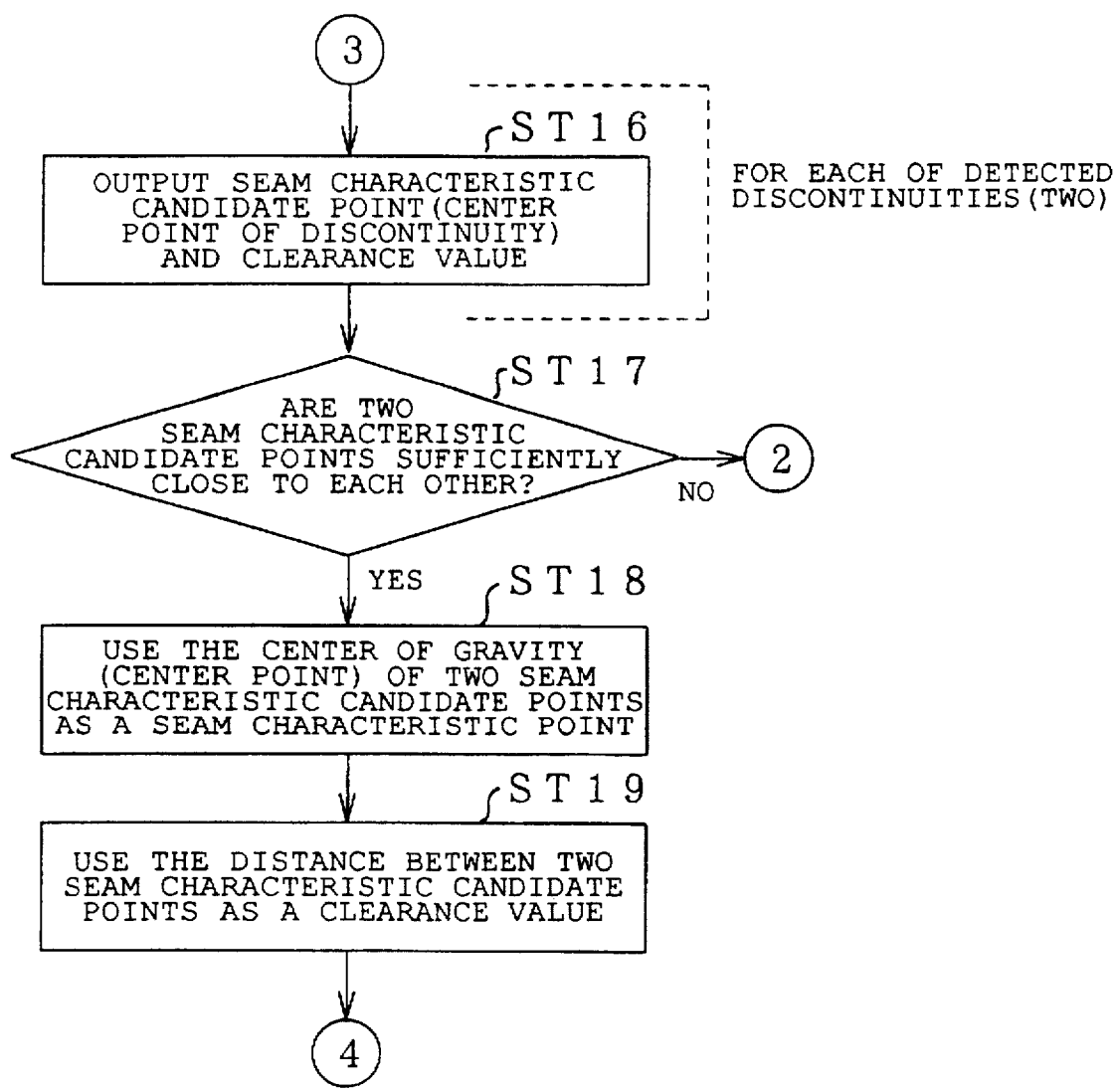
FIG. 11 is a part of the flowchart which shows steps continued from the steps shown in FIG. 8.
Figure 12:
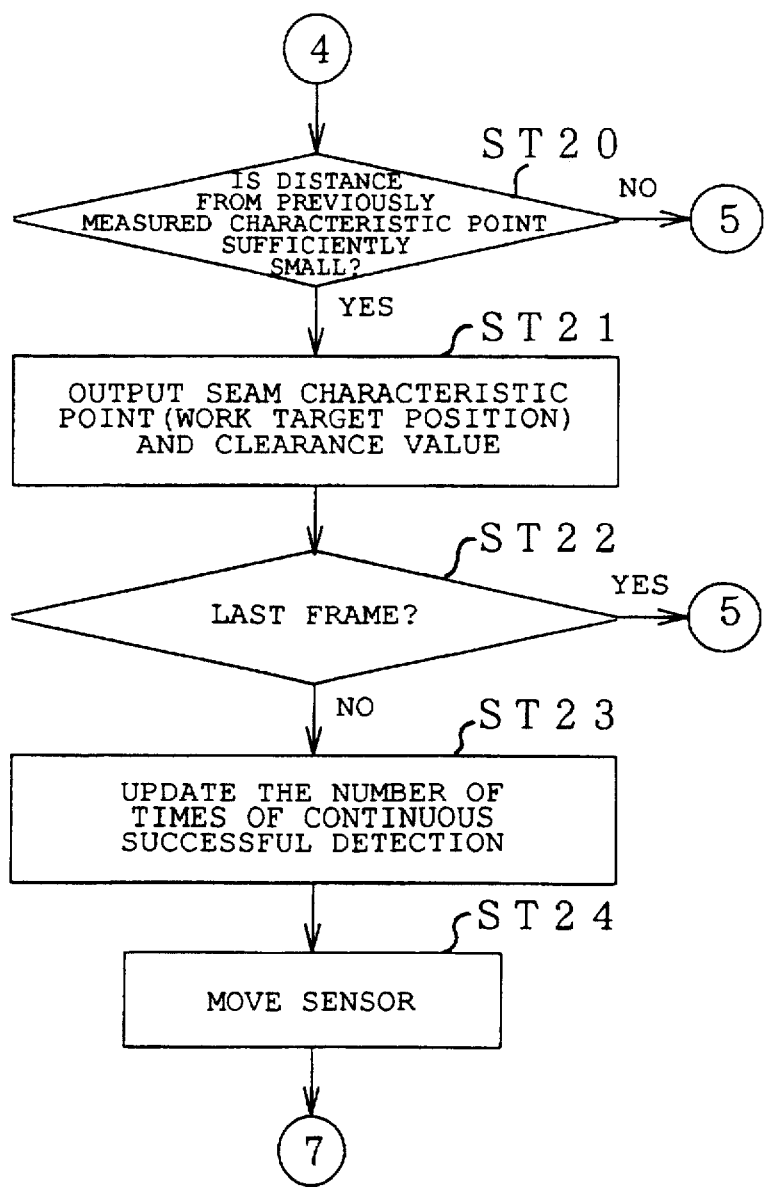
FIG. 12 is a part of the flowchart which shows steps continued from the steps shown in FIG. 8.

(from which direction the end surface of the upper member cannot be viewed) and along direction B-3 (normal direction). As shown in FIGS. 6 and 7, as in the case of a clearance existing, coordinate data B-5 and B-6, each consisting of a series of distance points obtained through the measurement, include discontinuities B-8 and B-9, respectively. Subsequently, each of the center points B-11 and B-12 of the discontinuities are obtained as a seam characteristic point; i.e., a work target position.

In contrast, when measurement is performed along direction B-4 (from which direction the end surface of the upper member can be viewed), coordinate data of a series of distance points include no discontinuity, as shown in FIG. 7. In this case, a bend point B-10 is detected and is used as a substitute so as to obtain a seam characteristic point; i.e., a work target position.

The present invention will now be described in further detail based on an example of the method thereof.

(Example of the Method)

FIGS. 8 to 12 show a procedure for detecting work target points using a method for detecting seam characteristic points according to an example of the present method.

In the present example, a robot system similar to that used in the above-described embodiment of the present invention is used. The processing of the present example is repeatedly performed while the sensor 2 observes an area in the vicinity of an end point of an object while following the object. Hereinafter, each unit of measurement which is performed by the sensor 2 following the object is called a frame. The following description will be made under the assumption that a path which is formed by a seam portion and which is to be followed by the nozzle 3 is smooth.

In the present example of the method, a parameter c which represents how many times successful detection of a seam characteristic point has been continued is first reset, and $x_{pre}$ which represents the x-coordinate value of a seam characteristic point obtained in the frame immediately before the present frame is reset to 0 (ST1).

Next, the range of view in the x-direction ($x_s$, $x_e$) is calculated by equations (1) and (2) (ST2).

$$x_s = x_{pre} - r_{def} \alpha^c \quad (1)$$

$$x_e = x_{pre} - r_{def} \alpha^c \quad (2)$$

where $r_{def}$ is an initial value of the range of view, and $\alpha$ is a reduction coefficient ($0 < \alpha < 1$).

Subsequently, an area in the vicinity of the seam portion of the object is observed by the sensor 2 so as to obtain coordinate data of a series of distance points. When the coordinate data of the series of distance points include noise due to an isolated point, such noise due to the isolated point is removed by filtering using a median filter or the like, which is performed as a preprocessing (ST3).

Next, statistical values regarding the distance between paired adjacent distance points and a discontinuity threshold level $th_{jump}$ is determined (ST4). That is, the discontinuity threshold level $th_{jump}$, which depends on the resolution of the coordinate data of the series of distance points (basic distance to an adjacent distance point) and variations (dispersion) of noise superposed on the coordinate data, is obtained from the statistical values in accordance with the following equation (3).

$$th_{jump} = k_1 \cdot \sigma_{points} + \mu_{points} \quad (3)$$

wherein $\sigma_{points}$ is the standard deviation of the distance between paired adjacent distance points, and $\mu_{points}$ is the average thereof. When the coordinates of each distance point whose x-coordinate value is within a range from $x_s$ to $x_e$ are ($x_i$, $y_i$), where i (=0, ... n−1) is an index representing each distance point and varies from 0 to n−1 in the ascending order in the x-coordinate value, the distance $d_{i,i+1}$ between paired adjacent distance points can be obtained by the following equation:

$$\sqrt{(x_{i+1} - x_i)^2 + (y_{i+1} - y_i)^2}$$

From thus obtained distance, the above described standard deviation and the average are obtained by equations (4) and (5).

$$\mu_{points} = \frac{\sum_{i=0}^{n-1} d_{i,i+1}}{n-1} \quad (4)$$

$$\sigma_{points} = \sqrt{\sum_{i=0}^{n-1} (d_{i,i+1} - \mu_{points})^2 / (n-1)} \quad (5)$$

Next, the distance $d_{i,i+1}$ between paired adjacent distance points is compared with the threshold level $th_{jump}$. When the distance is greater than the threshold level, it is judged that a discontinuity exists (ST5). In this case, the comparison is started from $d_{n/2,n/2+1}$ (i.e., the distance between paired adjacent distance points near the center of the measurement range) and is made in the order of $d_{n/2-1,n/2}$, $d_{n/2+1,n/2+2}$, $d_{n/2-2,n/2-1}$, $d_{n/2+2,n/2+3}$, ...

In the cross-sectional shape of the seam portion of the plate-like object shown in FIG. 1, two or more discontinuities are not measured. Therefore, 2 is set as a predetermined number of discontinuities to be detected, and it is judged whether two discontinuities are detected (ST6). The processing for discontinuity detection is performed until two discontinuities are detected.

Moreover, it is judged whether the pair of $d_{0,1}$, $d_{n-2,n-1}$ at the edge of the measurable range is reached (ST7). The processing for discontinuity detection is performed up to the pair at the edge of the measurable range.

Subsequently, the number of detected discontinuities is judged (ST8), and processing corresponding to the number is executed so as to determine a seam characteristic point (precisely, work target position).

[Case where no discontinuities exist]

Figure 13:
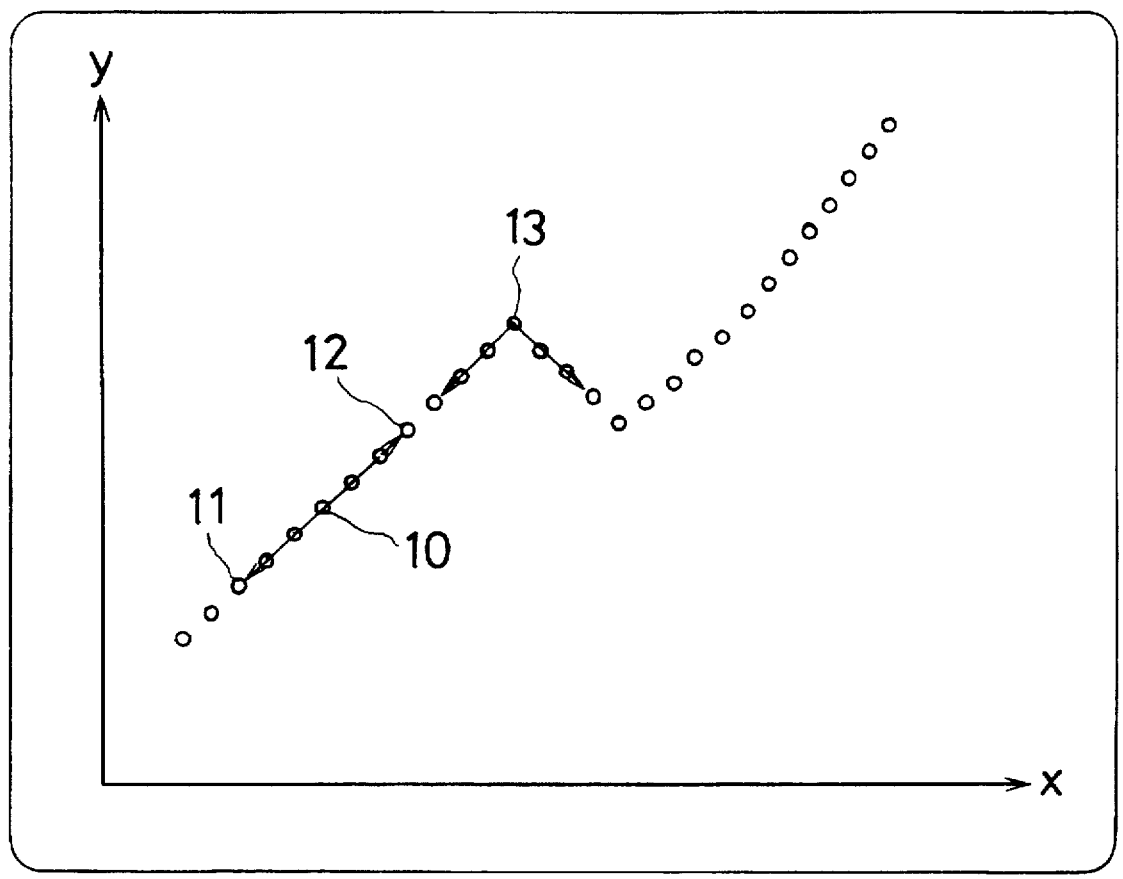
FIG. 13 is an explanatory illustration showing the method for determining a seam characteristic point from a bend point by using the example of the method of the present invention.

When no discontinuities exist or when no discontinuity is detected through the comparison up to the pair of $d_{0,1}$, $d_{n-2,n-1}$, vectors 11 and 12 are created before and after each distance point 10 of the coordinate data D of the measured series of distance points such that each of the vectors 11 and 12 connects a predetermined number (M) of points adjacent to the distance point 10 (in the example shown in FIG. 13, three points), as shown in FIG. 13. A distance point at which a concave bend is formed and at which the angle formed by the vectors 11 and 12 is closest to 90 degrees is regarded as a bend point 13, and the bend point 13 is used as a seam characteristic candidate point (ST9).

Specifically, a distance point used as a bend point is a distance point at which the sign of the outer product of vectors $(x_{i-M} - x_i)*(y_{i+M} - y_i) - (x_{i+M} - x_i)*(y_{i-M} - y_i)$ is positive and the value, which is obtained by normalizing the value of inner product using the vector length as follows:

$$\frac{(x_{i+M} - x_i)*(x_{i-M} - x_i) + (y_{i+M} - y_i)*(y_{i-M} - y_i)}{\sqrt{(x_{i+M} - x_i)^2 + (y_{i+M} - y_i)^2} \sqrt{(x_{i-M} - x_i)^2 + (y_{i-M} - y_i)^2}},$$

is closest to 0, and is within an allowable range. The coordinates $(x_j, y_j)$ of the bend point is regarded as the coordinates of a seam characteristic candidate point.

Subsequently, it is judged whether the angle formed at the seam characteristic candidate point (bend point) is sufficiently close to 90 degrees (ST10). When the angle is sufficiently close to 90 degrees, that bend point is used as a seam characteristic point, and the clearance value is set to a predetermined value (for example, 0) (ST11).

When the angle is away from 90 degrees, it is further judged whether the current frame is the last frame (ST12). When the current frame is the last frame, the processing is ended. When the current frame is not the last frame, the sensor 2 is moved (ST13) and the processing returns to the first step (ST1).

In the present example of the apparatus, it is assumed that the end surface of the upper one of two overlapped members which form a seam portion therebetween is cut at a right angle. Therefore, a distance point at which the inner product becomes close to zero is used as a bend point. However, when the cut angle of the end surface is set to an angle other than 90 degrees, a distance point at which the inner product is close to a value corresponding to the cut angle and is within the allowable range is used as a bend point, and this bend point is used as a seam characteristic point.

[Case where a single discontinuity exists]

When a single discontinuity exists, paired distance points located on both sides of a discontinuity (their indexes are i and i+1, respectively) are used so as to obtain the center point of the discontinuity. This center point $((x_i+x_{i+1})/2, (y_i+y_{i+1})/2))$ is used as a seam characteristic point (ST14). The size of the discontinuity is (the distance $d_{i,i+1}$ between the paired distance points located on both sides of the discontinuity) is used as a clearance value (ST15).

[Case where two discontinuities exist]

When two discontinuities exit, the same calculation processing as the above described case where a single discontinuity exists is performed for each of the discontinuities, and the two center points of the discontinuities (seam characteristic candidate points) are obtained (ST16).

That is, when the indexes of the paired distance points located on both sides of the first discontinuity are i and i+1, while the indexes of the paired distance points located on both sides of the second discontinuity are j and j+1, the coordinates of one center point $((x_i+x_{i+1})/2, (y_i+y_{i+1})/2))$ and the coordinates of other center point $((x_j+x_{j+1})/2, (y_j+y_{j+1})/2))$ are calculated.

Subsequently, it is judged whether the two seam characteristic candidate points are sufficiently close to each other (ST17). That is, it is judged whether the distance $$\sqrt{(x_i + x_{i+1} - x_j - x_{j+1})^2 + (y_i + y_{i+1} - y_j - y_{j+1})^2} \, / 2$$

is greater than a given threshold level.

When the result of the judgment in step ST17 indicates that the two seam characteristic candidate points are sufficiently close to each other, the center of gravity (center point) of the detected two seam characteristic candidate points, $$((x_i+x_{i+1}+x_j+x_{j+1})/4, (y_i+y_{i+1}+y_j+y_{j+1})/4),$$

is used as a seam characteristic point (ST18). The distance between the two seam characteristic candidate points is used as a clearance value (ST19).

When the result of the judgment in step ST17 indicates that the two seam characteristic candidate points are not sufficiently close to each other, there is a possibility that noise has been measured, for example, at the edge portion of the range in which a series of distance points can be measured and a discontinuity has been detected there. Therefore, calculation of a seam characteristic point is not performed. In this case, it is further judged whether the current frame is the last frame (ST12). When the current frame is the last frame, the processing is ended. When the current frame is not the last frame, the sensor 2 is moved (ST13) and the processing returns to the first step (ST1).

In the present example of the apparatus, the predetermined number of discontinuities is set to 2. However, when a number greater than 2 is set as the predetermined number of discontinuities, a center of gravity is obtained from seam characteristic candidate points corresponding to discontinuities which have been detected until the number of the detected discontinuities reaches the set number, and the center of gravity is alternatively used as a seam characteristic point. The largest one of the distances between the seam characteristic candidate points (center points) of the respective discontinuities is used as a clearance value.

Next, it is judged whether the distance between the previously measured seam characteristic point and the seam characteristic point detected this time is sufficiently small (ST20).

That is, when the distance between the position $(x_{pre}, y_{pre})$ of the seam characteristic point of the frame immediately before the current frame and the position $(\hat{x}, \hat{y})$ of the seam characteristic point detected this time are sufficiently close to each other; i.e., when $$\sqrt{(\hat{x} - x_{pre})^2 + (\hat{y} - y_{pre})^2} < th_d,$$

the seam characteristic point is determined as an actual work target position, and the position of the seam characteristic point and the clearance value are output as control data for the robot (ST21). The $th_d$ is a distance threshold for the distance between the seam characteristic points of the adjacent frames.

When the number of times c of continuous detection is 0, the position $(\hat{x}, \hat{y})$ of the seam characteristic point detected this time is used as a work target position, and the position of the seam characteristic point and the clearance value are output as control data for the robot (ST21).

When the condition $$\sqrt{(\hat{x} - x_{pre})^2 + (\hat{y} - y_{pre})^2} < th_d$$

is not satisfied, it is judged that detection of a seam characteristic point has been failed, and the processing is ended.

After step ST21, it is judged whether the current frame is the last frame (ST22). When the current frame is the last frame, the processing is end. When the current frame is not the last frame, the number of times c of continuous successful detection is incremented by one, and $(x_{pre}, y_{pre})$ are set to $(\hat{x}, \hat{y})$ (ST23). Subsequently, the sensor is moved (ST24), and the processing is moved back to step ST2 for calculation of the range of view.

In the above-described example of the method according to the present invention, a very simple method is used. That is, when the robot follows a seam portion between plate-shaped members, a discontinuity inherent to the seam portion is detected from the data of a series of distance points representing the cross-sectional shape in the vicinity of the seam portion. When such a discontinuity cannot be detected, a bend point is detected. Based on the detected values, a seam characteristic point, which becomes a work target position, is obtained.

Accordingly, seam characteristic points of a seam having a variety of cross-sectional shapes can be detected accurately and quickly. Also it is possible to stably and reliably detect seam characteristic points from the coordinate data of a series of distance points on which noise is superposed, or from measured distance data which do not have spatially uniform distribution, regardless of the direction of measurement of a sensor.

Moreover, a value indicating the clearance of the seam portion can be properly obtained in accordance with the state of an object to be worked.

Although a typical example of the method of the present invention has been described, the present invention is not limited to the method described in the example and may be practiced by freely changing the method, insofar as the method can achieve the objects of the present invention and can provide the effects described below.

As described above, in the present invention, it is unnecessary to perform pattern matching between the coordinate data of a series of distance points and each model that represents the cross-sectional shape of a seam portion to be worked. Therefore, the present invention provide the effect that seam characteristic points, which become work target positions, can be accurately and quickly detected by using coordinate data of a series of distant points detected by a sensor.

Especially, it is possible to accurately and quickly detect seam characteristic points of a seam having a variety of cross-sectional shapes. In addition, a value indicating the clearance of the seam portion which is useful for work can be properly obtained in accordance with the state of an object to be worked.

We claim:

1. A method of detecting seam characteristic points of an object while sealing is performed by a robot equipped with a sensor, the method being characterized by comprising the steps of:

measuring a distance to an arbitrary cross section of an object with the sensor;

converting data obtained through the measurement into coordinate data of a series of distance points arranged in a predetermined order;

calculating a statistic value regarding the distance between paired adjacent distance points among the series of distant points;

obtaining a threshold level for judging discontinuity, based on the statistic value;

comparing the distance between paired adjacent distance points with said discontinuity threshold level so as to detect a pair of adjacent distance points which are separated from each other by a distance equal to or greater than said threshold level; and performing calculation processing corresponding to the number of detected pairs, each pair including two adjacent distance points which are separated from each other by a distance equal to or greater than said threshold level, so as to obtain a seam characteristic point.

2. A method of detecting seam characteristic points of an object while sealing is performed by a robot equipped with a sensor, said method being characterized by comprising the steps of:

measuring a distance to an arbitrary cross section of an object with the sensor;

converting data obtained through said measurement into coordinate data of a series of distance points arranged in a predetermined order;

calculating a statistic value regarding the distance between paired adjacent distance points among said series of distant points;

obtaining a threshold level for judging discontinuity, based on said statistic value;

comparing the distance between paired adjacent distance points with said discontinuity threshold level so as to detect a pair of adjacent distance points which are separated from each other by a distance equal to or greater than said threshold level;

counting the number of detected pairs, each pair including two adjacent distance points which are separated from each other by a distance equal to or greater than said threshold level;

when the total number of the counted pairs is one, obtaining, as a seam characteristic point, the center point between the detected pair of distance points separated from each other by a distance equal to or greater than said threshold level; and when the total number of the counted pairs is equal to or greater than two, obtaining, as a seam characteristic candidate point, the center point between each detected pair of distance points and calculating the center of gravity of said seam characteristic candidate points as a seam characteristic point.

3. A method of detecting seam characteristic points according to claim 1 or 2, characterized in that the size of the discontinuity between said pair of distance points separated from each other by a distance equal to or greater than said threshold level is obtained as a clearance value.

4. A method of detecting seam characteristic points according to claim 2, characterized in that the largest one of the distances between said seam characteristic candidate points is obtained as a clearance value.

5. A method of detecting seam characteristic points according to claim 1 or 2, characterized by further comprising a step in which when a pair of distance points separated from each other by a distance equal to or greater than said threshold level is not detected, a preset model representing a curved shape is compared with the coordinate data of a series of distance points so as to determine a bend point and the coordinates of the bend point are used as the position of a seam characteristic point.

6. A method of detecting seam characteristic points according to claim 1 or 2, characterized by further comprising a step in which when a pair of distance points separated from each other by a distance equal to or greater than said threshold level is not detected, vectors are created before and after each distance point such that each of the vectors connects a predetermined number of distance points, the inner product of these vectors is calculated, an angle formed by the two vectors is calculated from said inner product, and the coordinates of a distance point whose angle is closest to a predetermined angle is used as the position of a seam characteristic point.

7. A method of detecting seam characteristic points according to claim 1 or 2, characterized by further comprising a step in which when a pair of distance points separated from each other by a distance equal to or greater than said threshold level is not detected, vectors are created before and after each distance point such that each of the vectors connects a predetermined number of distance points, the inner product and outer product of these vectors are calculated, an angle formed by the two vectors is calculated from said inner product, it is judged based on said outer product whether the corner formed by the vectors is concave or convex as viewed from the origin of a sensor coordinate system, and the coordinates of a distance point whose angle is closest to a predetermined angle and whose corner is concave in the direction of observation is used as the position of a seam characteristic point.

8. A method of detecting seam characteristic points according to claim 1 or 2, characterized by further comprising a step in which when a pair of distance points separated from each other by a distance equal to or greater than said threshold level is not detected, vectors are created before and after each distance point such that each of the vectors connects a predetermined number of distance points, the inner product and outer product of the pair of vectors are calculated, and the coordinates of the starting point of the pair of vectors whose outer product is positive and whose inner product has an absolute value closest to zero are used as the position of a seam characteristic point.

9. A method of detecting seam characteristic points according to claim 1 or 2, characterized by further comprising a step in which a range for processing coordinate data of a series of distance points is set such that a seam characteristic point obtained from coordinate data of a series of distance points which was previously measured becomes the center of said range.

10. A method of detecting seam characteristic points according to claim 1 or 2, characterized by further comprising a step in which the width of a range for processing coordinate data of a series of distance points is set based on the number of times of continuous successful detection of seam characteristic points previously obtained.

11. A method of detecting seam characteristic points according to claim 1 or 2, characterized by further comprising a step in which said sensor is caused to follow an arbitrary cross section in the vicinity of a seam of an object so as to successively obtain seam characteristic points, and when the position of a seam characteristic point is separated from a predicted position of the seem characteristic point, which is obtained from the positions of seam characteristic points previously measured, by a distance equal to or greater than a preset distance, it is judged that calculation cannot be performed.

12. A method of detecting seam characteristic points according to claim 1 or 2, characterized by further comprising a step in which when the distance between the seam characteristic candidate points is greater than a preset distance threshold level, it is judged that calculation cannot be performed.

13. A method of detecting seam characteristic points according to claim 1 or 2, characterized by further comprising a step in which when noise caused by an isolated point is superposed on coordinate data of a series of distance points obtained through measurement, the noise is removed by filtering using a median filter or the like.

14. A method of detecting seam characteristic points of an object, characterized by comprising the steps of:
measuring a distance to an arbitrary cross section of an object with a sensor;
converting data obtained through said measurement into coordinate data of a series of distance points arranged in a predetermined order;
calculating a statistic value regarding the distance between paired adjacent distance points among said series of distant points;
obtaining a threshold level for judging discontinuity, based on said statistic value;
comparing the distance between paired adjacent distance points with said discontinuity threshold level so as to detect a pair of adjacent distance points which are separated from each other by a distance equal to or greater than said threshold level; and
obtaining the coordinates of a seam characteristic point of the object from the detected pair of adjacent distance points which are separated from each other by a distance equal to or greater than said threshold level,
wherein when a pair of distance points separated from each other by a distance equal to or greater than said threshold level is not detected, a preset model representing a curved shape is compared with the coordinate data of a series of distance points so as to determine a bend point and the coordinates of the bend point are used as the position of a seam characteristic point.

15. A method of detecting seam characteristic points of an object, characterized by comprising the steps of:
measuring a distance to an arbitrary cross section of an object with a sensor;
converting data obtained through said measurement into coordinate data of a series of distance points arranged in a predetermined order;
calculating a statistic value regarding the distance between paired adjacent distance points among said series of distant points;
obtaining a threshold level for judging discontinuity, based on said statistic value;
comparing the distance between paired adjacent distance points with said discontinuity threshold level so as to detect a pair of adjacent distance points which are separated from each other by a distance equal to or greater than said threshold level; and
obtaining the coordinates of a seam characteristic point of the object from the detected pair of adjacent distance points which are separated from each other by a distance equal to or greater than said threshold level,
wherein said sensor is caused to follow an arbitrary cross section in the vicinity of a seam characteristic point of an object so as to successively calculate seam characteristic points, and when the position of a seam characteristic point is separated from a predicted position of the seem characteristic point, which is obtained from the positions of seam characteristic points previously measured, by a distance equal to or greater than a preset distance, it is judged that calculation cannot be performed.

16. A method of detecting seam characteristic points of an object, characterized by comprising the steps of:
measuring a distance to an arbitrary cross section of an object with a sensor;
converting data obtained through said measurement into coordinate data of a series of distance points arranged in a predetermined order;
calculating a statistic value regarding the distance between paired adjacent distance points among said series of distant points;
obtaining a threshold level for judging discontinuity, based on said statistic value;
comparing the distance between paired adjacent distance points with said discontinuity threshold level so as to detect a pair of adjacent distance points which are separated from each other by a distance equal to or greater than said threshold level; and obtaining the coordinates of a seam characteristic point of the object from the detected pair of adjacent distance points which are separated from each other by a distance equal to or greater than said threshold level, wherein there are further provided:

first means for causing said sensor to follow an arbitrary cross section in the vicinity of a seam characteristic point of the object so as to successively calculate seam characteristic points, and for setting a range for processing coordinate data of a series of distance points such that a seam characteristic point obtained from coordinate data of a series of distance points which was measured at a previous time becomes the center of said range; and second means for setting the width of said range for processing based on the number of times of continuous successful detection of seam characteristic points previously obtained.

* * * * *